(No Model.)

B. WING.

DEVICE FOR CENTERING HUBS AND OTHER BLOCKS.

No. 330,536. Patented Nov. 17, 1885.

WITNESSES
J. M. Dolan.
Fred. B. Dolan.

INVENTOR
Benj. Wing
by his attys
Clarke & Raymond

UNITED STATES PATENT OFFICE.

BENJAMIN WING, OF VASSALBOROUGH, MAINE.

DEVICE FOR CENTERING HUBS AND OTHER BLOCKS.

SPECIFICATION forming part of Letters Patent No. 330,536, dated November 17, 1885.

Application filed March 3, 1885. Serial No. 157,610. (No model.)

*To all whom it may concern:*

Be it known that I, BENJAMIN WING, of Vassalborough, in the county of Kennebec and State of Maine, a citizen of the United States, have invented a new and useful Improvement in Devices for Centering Hubs and other Blocks, of which the following is a full, clear, and exact description, reference being had to the accompanying drawings, forming a part of this specification in explaining its nature.

My invention relates to means for automatically centering a hub or other block and for presenting it while thus centered to the action of an auger or other tool. It is especially desirable, in order to save stock and time, to locate automatically in proper position for boring a hub-block, and, so far as I am aware, there is no machine which automatically locates or centers the block and holds it while thus centered during the operation of the boring-tool.

Figure 1:
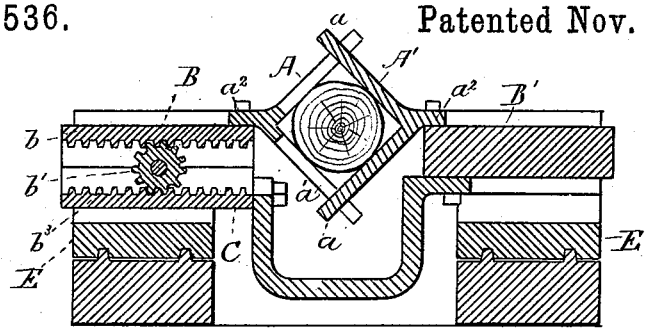
Figure 2:
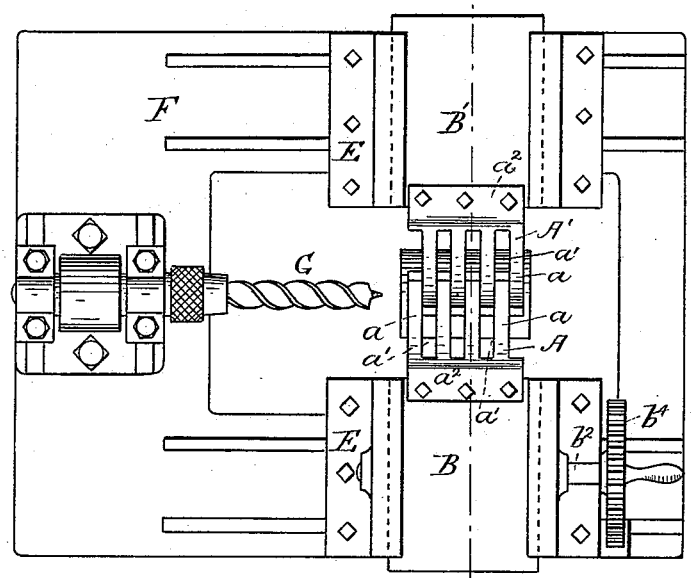
Figure 3:
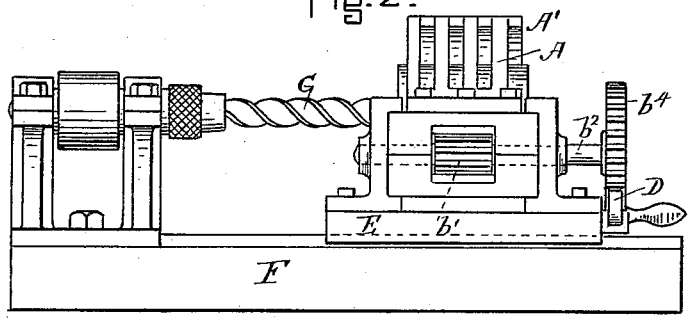

Referring to the drawings, Figure 1 is a vertical section of the machine on the line $y\ y$ of Fig. 2. Fig. 2 is a plan view thereof, and Fig. 3 is a side elevation.

The device comprises two jaws, which have a closing and opening movement in relation to each other, and are simultaneously operated to move a uniform distance either toward or from each other, as the case may be. These jaws are so shaped that they lap or extend by each other, and thereby accommodate or center blocks of any size, the movement of the jaws being sufficient to shut them upon blocks of the smallest diameter.

In the drawings, A is one jaw, and A' the other. They are substantially counterparts, with the exception that the fingers or projections $a$ of one jaw are arranged to shut into the spaces $a'$ of the other jaw, as represented in Figs. 1 and 2, so that when they are moved together the fingers cross each other, and they can be moved inward or closed the full length of the recesses or slots between the fingers. The jaws are arranged upon their holding blocks or supports B B' so that their upper and lower sections or surfaces shall be inclined at the same angle from the blocks, as represented, and each jaw has a backward-extending projection, $a^2$, by which it is bolted in place to the end of its operating-block. The jaw A is secured to the end of the block B, and the other jaw, A', to the end of the block B'. The first-named block has upon its under surface the rack $b$, and there is arranged to engage therewith a pinion, $b'$, upon the shaft $b^2$, one end of which extends outward therefrom. This pinion also engages another rack, $b^3$, which is formed upon the upper surface of the movable block C, and this movable block has at its front end a downwardly-projecting arm, $c$, which is bent outward and upward, and connected with the block B', as shown in Fig. 1. Upon the end of the shaft $b^2$ there is arranged a hand-wheel, $b^4$, for operating the pinion $b'$. It will be observed that upon the revolution of the pinion $b'$ the upper block, B, is moved in one direction, and the lower block, C, is moved in the reverse direction, and, consequently, as the lower block is connected with the other jaw-block, B', it must move that block in the same direction. Consequently, upon the movement of the pinion both of the jaw-blocks are moved toward each other or away from each other, according to the movement of the pinion, and they are held open or closed or in any position by means of the dog D, which enters between the teeth on the hand-wheel $b^4$. The various blocks are supported by a carriage, E, which carriage E has a movement upon the table or bed F of the machine toward and from the auger or other tool, G, and the carriage is guided thereon either by projections upon the table which enter grooves in the carriage, or by projections upon the carriage which enter guiding-grooves in the table.

To center a block, the jaws are opened sufficiently wide to receive the block, and are then closed thereon, and the block is moved by one jaw or the other until all contacting surfaces of the jaws come in contact with the block and hold it and lock it rigidly in position; and when all the bearing-surfaces of the jaws reach a full bearing upon the block the block of necessity must be centrally located, and it is held in this central position, the hand-wheel being locked by the dog or in any desirable way. The carriage is then moved toward the auger and the hub bored. Of course, this device may be used for centering a great many other objects or things than hub-blocks, and I do not confine myself to this use of the invention.

It is of course obvious that the jaws may be moved simultaneously together or apart by other devices than those herein specified; and I would have it understood that I do not confine this part of the invention to use in connection with the specific devices herein described, as any other means for giving the jaws a simultaneous movement at the same rate of speed to and from each other may be employed.

It will be observed that on account of the shape and inclination of the jaws and the arrangement of the fingers and spaces so that the fingers close by each other, anything introduced between them which has anything like a regular surface must be automatically moved or brought into a central position.

Of course, the effect of the invention would be reached if one jaw were stationary and one only to be moved.

Having thus fully described my invention, I claim and desire to secure by Letters Patent of the United States—

1. The combination, in a hub-block-centering machine, of a jaw, A, having two sets of oppositely-diverging fingers, $a$, having spaces or recesses $a'$ between them, arranged so that the fingers of one jaw come opposite and in operation enter the recesses of the other, all substantially as and for the purposes described.

2. The combination, in a hub-block-centering machine, of the jaw A, having the diverging fingers $a$ and the spaces or recesses $a'$ between them, and the jaw A', having the diverging fingers $a$ and the spaces or recesses $a'$ between them, the block B, supporting the jaw A, and the block B', supporting the jaw A', and devices for imparting horizontal movements to said blocks toward and from each other, all substantially as and for the purposes described.

3. The combination, in a block-centering machine, of the jaws A A', having the diverging fingers $a$ and spaces or recesses $a'$, shaped and arranged in relation to each other as specified, the block B, having a rack, $b$, the pinion $b'$, and the sliding block C, connected with the block D, whereby upon the movement of the pinion $b'$ the blocks B B' are moved simultaneously toward or away from each other, substantially as described.

4. The combination of the jaws A A', having recessed diverging centering-surfaces of the character specified, their supporting-blocks B B', having horizontal sliding movements toward and away from each other, and a locking device for locking the two blocks in any desired position, all substantially as and for the purposes described.

5. The combination of the bed F, having the sliding carriage E and supporting the blocks C B B', and the jaws A A', having centering-surfaces oppositely arranged to each other, and provided with recesses whereby they may overlap, and a pinion for providing the said jaws, through the said blocks C B B', with opening and closing movements in relation to each other upon the carriage E, all substantially as described.

BENJAMIN WING.

Witnesses:
S. T. CANNON,
E. S. MAYO.